United States Patent [19]

Campbell

[11] 4,337,192

[45] Jun. 29, 1982

[54] THERMOPLASTIC MOLDING COMPOSITION HAVING IMPROVED WARP RESISTANCE AND PROCESS FOR PREPARING THE SAME

[75] Inventor: Richard W. Campbell, Evansville, Ind.

[73] Assignee: General Electric Company, Pittsfield, Mass.

[21] Appl. No.: 178,521

[22] Filed: Aug. 15, 1980

[51] Int. Cl.$^3$ .............................................. C08L 67/02
[52] U.S. Cl. ..................................... 523/212; 525/92; 525/439; 525/444; 523/213; 524/539
[58] Field of Search ................ 260/40 R; 525/1, 444, 525/92, 439

[56] References Cited

U.S. PATENT DOCUMENTS

| | | | |
|---|---|---|---|
| 2,465,319 | 3/1949 | Whinfield et al. | 528/278 |
| 3,023,182 | 2/1962 | Tanabe et al. | 525/61 |
| 3,047,539 | 7/1962 | Pengilly | 560/84 |
| 3,651,014 | 3/1972 | Witsiepe | 528/309 |
| 3,763,109 | 10/1973 | Witsiepe | 528/274 |
| 3,766,146 | 10/1973 | Witsiepe | 528/305 |
| 3,884,870 | 5/1975 | Dodson et al. | 260/40 R |
| 4,140,669 | 2/1979 | Phipps, Jr. et al. | 260/40 R |
| 4,140,670 | 2/1979 | Charles | 260/40 R |
| 4,155,898 | 5/1979 | Bopp et al. | 260/40 R |
| 4,203,887 | 5/1980 | Goedde et al. | 260/40 R |

Primary Examiner—Theodore E. Pertilla
Attorney, Agent, or Firm—Hedman, Casella, Gibson & Costigan

[57] ABSTRACT

Thermoplastic molding compositions are described, comprising a high molecular weight linear polyester or polyesters, optionally in admixture with block copolyesters, an impact modifier and a filler. These compositions are moldable into articles having improved properties.

10 Claims, No Drawings

THERMOPLASTIC MOLDING COMPOSITION HAVING IMPROVED WARP RESISTANCE AND PROCESS FOR PREPARING THE SAME

BACKGROUND OF THE INVENTION

The present invention relates to molding compositions which exhibit improved warp resistance, high deflection temperature under load (DTUL) and high impact strength in the molded article. More particularly, the invention relates to compositions comprising a thermoplastic resin selected from the group comprising a high molecular weight linear polyester, mixtures of high molecular weight linear polyesters, mixtures of a high molecular weight linear polyester and high molecular weight block polyester and mixtures of high molecular weight linear polyesters and high molecular weight block copolyester, an impact modifier and a filler material selected from the group comprising finely divided surface treated clay and amorphous silica and a process for improving the warp resistance of the polyester resin compositions without impairing other desirable properties such as strength, modulus and heat deflection temperature.

With the development of molecular weight control, the use of necleating agents and two-step molding cycles, poly(ethylene terephthalate) has become an important constituent of injection moldable compositions. Poly(1,4-butylene, terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

It has been previously disclosed in co-pending application Ser. No. 662,910, filed Mar. 1, 1976, assigned to the same assignee as herein, that glass reinforced thermoplastic compositions of a polycarbonate resin and poly(1,4-butylene terephthalate) can be molded into articles having greater resistance to warpage and/or improved DTUL, in comparison with glass fiber reinforced poly(1,4-butylene terephthalate) resins. It is further disclosed in co-pending application Ser. No. 753,861, filed Dec. 23, 1976, assigned to the same assignee as herein, that zinc stearate when added to polyester polyblends elevates notched Izod impact strength, while maintaining unnotched impact strength, flexural strength and tensile strength and dramatically reduces sample-to-sample variability in elongation. Also, it is disclosed in co-pending application Ser. No. 753,863, filed Dec. 23, 1976, and assigned to the same assignee as herein, that glass fibers in combination with a mineral filler provide molded articles with improved DTUL and/or reduced warpage. In addition, it is disclosed in co-pending application Ser. No. 747,635, filed Dec. 6, 1976, assigned to the same assignee as herein, that compositions comprising poly(butylene terephthalate), poly(ethylene terephthalate), a polycarbonate and glass fiber have increased DTUL and/or reduced warpage. It is disclosed in co-pending application Ser. No. 778,945, filed Mar. 18, 1977, that blends of a poly(1,4-butylene terephthalate) resin and a polycarbonate resin reinforced with fibrous glass, when admixed with a small amount of zinc stearate possess even less inherent warpage in the molded article and good moldability when compared with compositions of glass fiber reinforced poly(1,4-butylene terephthalate).

It has also been previously disclosed in co-pending application Ser. No. 866,009, filed Dec. 30, 1977, and assigned to the same assignee as herein, that high molecular weight linear polyester, such as poly(1,4-butylene terephthalate) and the like, either reinforced or unreinforced, can be made flame-retardant and exhibit improved arc resistance when admixed with a flame-retarding amount of a flame-retardant, such as an aromatic polycarbonate and a particulate material selected from the group consisting of finely divided mica and finely divided clay. It has also been previously disclosed in co-pending application Ser. No. 925,992, filed July 19, 1978, and assigned to the same assignee as herein, to provide improved reinforced thermoplastic molding compositions having improved resistance to warpage, high deflection temperature under load (DTUL) and high impact strength comprising a thermoplastic resin selected from the group consisting of a high molecular weight linear polyester, a mixture of high molecular weight linear polyesters, a mixture of high molecular weight linear polyester and high molecular weight block copolyester and a mixture of high molecular weight linear polyesters and high molecular weight copolyester, fibrous glass reinforcement, phlogopite mica and an impact modifier. In addition, there is also disclosed in U.S. Pat. No. 4,140,670 molding compositions and molded products of polybutylene terephthalate, reinforcing glass fibers, phlogopite mica and poly-butylene terephthalate-co-tetramethylene oxide) which have improved warp-resistance properties.

It has now been discovered that compositions of high molecular weight linear polyesters, optionally in admixture with block copolyesters, an impact modifier and a filler material selected from the group comprising finely divided surface treated clay and amorphous silica exhibit very little inherent warpage in the molded article and, in addition, are high in strength and exhibit a high modulus and heat deflection temperature.

DESCRIPTION OF THE INVENTION

According to this invention, there are provided improved thermoplastic molding compositions having improved warp resistance, as well as high deflection temperature under load (DTUL) and good impact strength, useful for molding, e.g., injection molding, compression molding and transfer molding, the composition comprising:

(a) a thermoplastic resin selected from the group consisting of a high molecular weight linear polyester, a mixture of high molecular weight linear polyesters, a mixture of a high molecular weight linear polyester and a high molecular weight block copolyester and mixtures of high molecular weight linear polyesters and high molecular weight block copolyester, wherein said block copolyester is derived from blocks of (i) a terminally-reactive poly(1,4-butylene terephthalate) and (ii) a terminally-reactive aromatic/aliphatic copolyester of a dicarboxylic acid selected from the group consisting of terephthalic acid, isophthalic acid, naphthalene dicarboxylic acids, phenyl indane dicarboxylic acid and compounds of the formula:

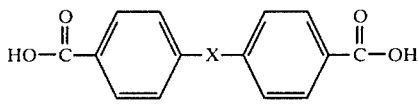

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid, or (iii) a terminally-reactive aliphatic polyester of a straight chain aliphatic dicarboxylic acid having from 4 to 12 carbon atoms in the chain and a straight or branched chain aliphatic glycol, said blocks being connected by inter terminal linkages consisting essentially of ester linkages;

(b) an impact modifier; and (c) a filler material selected from the group comprising finely divided surface treated clay and amorphous silica.

The high molecular weight linear polyesters of this invention include, in general, linear saturated condensation products of diols and dicarboxylic acids, or reactive derivatives thereof. Preferably, they will comprise condensation products of aromatic dicarboxylic acids and aliphatic diols. Although the diol portion of the polyester can contain from two to ten carbon atoms, it is preferred that it contain from two to four carbon atoms in the form of linear methylene chains. It is to be understood that it is also possible to use polyesters such as poly(1,4-dimethylol cyclohexane dicarboxylates), e.g., terephthalates). In addition to phthalates, small amounts of other aromatic dicarboxylic acids, such as naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols, such as cyclohexanedimethanol. In any event, the preferred polyesters are well known as film and fiber formers, and they are provided by methods outlined in Whinfield, U.S. Pat. No. 2,465,319 and Pengilly, U.S. Pat. No. 3,017,539 and elsewhere. The preferred polyesters will comprise a poly(alkylene terephthalate), isophthalate or mixed isophthalate-terephthalate, e.g., up to 30 mole percent isophthalate, the alkylene groups containing from 2 to 10 carbon atoms, e.g., poly(ethylene terephthalate) or poly(1,4-butylene terephthalate). Because of its rapid crystallization from the melt, it is preferred to use poly(1,4-butylene terephthalate) as the linear polyester resin component of the present compositions. Also contemplated within the scope of this invention are the use of mixtures of linear polyesters, such as a mixture of poly(ethylene terephthalate) and poly(1,4-butylene terephthalate). When these mixtures are utilized the poly(ethylene terephthalate) can be used in amounts of from about 1–40% by weight, preferably 15–30% by weight of the total composition.

The "block copolyesters" also useful in the compositions of this invention are prepared by the reaction of terminally-reactive poly(butylene terephthalate), preferably, low molecular weight, and a terminally-reactive copolyester or polyester in the presence of a catalyst for transesterification, such as zinc acetate, manganese acetate, titanium esters, and the like. The terminal groups are hydroxyl, carboxyl, carboalkoxy, and the like, including reactive derivatives thereof. The result of reaction between two terminally reactive groups, of course, must be an ester linkage. After initial mixing, polymerization is carried out under standard conditions, e.g., 220° to 280° C., in a high vacuum, e.g., 0.1 to 2 mm Hg, to form the block copolymer of minimum randomization in terms of distribution of chain segments. These copolyesters are described in copending U.S. application Ser. No. 752,325, filed on Dec. 20, 1976, which is hereby incorporated by reference.

The copolyester designated component (ii), hereinabove, is preferably prepared from terephthalic acid or isophthalic acid or a reactive derivative thereof and a glycol, which may be a straight or branched chain aliphatic glycol. Illustratively, the glycol will be 1,4-butanediol; 1,5-pentanediol; 1,6-hexanediol; 1,9-nonanediol; 1,10-decanediol; neopentyl glycol; 1,4-cyclochexanediol; 1,4-cyclohexane dimethanol, a mixture of any of the foregoing, or the like. Illustrative of suitable aliphatic dicarboxylic acids for the mixed aromatic/aliphatic embodiments are suberic, sebacic, azelaic, adipic acids, and the like.

The copolyesters may be prepared by ester interchange in accordance with standard procedures. The copolyesters designated (ii) are most preferably derived from an aliphatic glycol and a mixture of aromatic and aliphatic dibasic acids in which the mole ratio concentration of aromatic to aliphatic acids is from between 1 to 9 and 9 to 1, with an especially preferred range being from about 3 to 7 to about 7 to 3.

The terminally reactive aliphatic polyesters designated component (iii) will contain substantially stoichiometric amounts of the aliphatic diol and the aliphatic dicarboxylic acid, although hydroxy-containing terminal groups are preferred.

In addition to their ease of formation by well-known procedures, both the aromatic/aliphatic copolyesters (ii) and the aliphatic polyesters (iii) are commercially available. One source for such materials is Emery Industries, Cincinnati Ohio, which designates its compounds as "Plastolein."

The block copolyesters contemplated herein preferably comprise from 95 to 50 parts by weight of the segments of poly(1,4-butylene terephthalate). The poly(1,4-butylene terephthalate) blocks, before incorporation into the block copolyesters, will preferably have an intrinsic viscosity of above 0.1 dl./g. and preferably, between 0.1 and 0.5 dl./g., as measured in a 60:40 mixture of phenol/tetrachloroethane at 30° C. The balance, 5 to 50 parts by weight of the copolyester will comprise blocks of components (ii) or (iii).

As will be understood by those skilled in the art, the poly(1,4-butylene terephthalate) block can be straight chain or branched, e.g., by use of a branching component, e.g., 0.05 to 1 mole %, based on terephthalate units, of a branching component which contains at least three ester-forming groups. This can be a glycol, e.g., pentaerythritol, trimethylolpropane, and the like, or a polybasic acid compound, e.g., trimethyl trimesate, and the like.

Among the impact modifiers included within the scope of the present compositions are segmented copolyester-ethers known as Hytrel (du Pont), silicone-polycarbonate block copolymer, e.g., Copel 3320 (G.E.). In general, the impact modifier is present in the composition of this invention in amounts within the range of from about 1 to 20%, by weight, preferably 1–15%, by weight, of the total composition.

The segmented copolyester-ethers useful as impact modifiers herein are described in U.S. Pat. Nos. 3,023,182, 3,651,014, 3,763,109 and 3,766,146, which are incorporated herein by reference. A preferred impact modifier is a segmented block copolyester-ether consisting of hard segments of polybutylene terephthalate and soft segments of polybutylene oxide.

The surface treated clay employed herein is finely divided, having particle sizes of from about 1 to about 50 microns and which has been surface-treated with a silane material such as aminosilane-like gamma-aminopropyltriethoxy-silane, a short chain ($C_1$–$C_2$) vinyl silane such as vinyl-tris($\beta$-methoxyethyoxyl)silane, long chain ($C_{18}$) vinyl silane and the like.

The amorphous silica which may be advantageously employed in the present invention will preferentially have a particle size of from about 1 to about 50 microns and will be similar to that which is commercially available from the Illinois Mineral Company.

It is to be understood that the surface treated clay, amorphous silica or the like employed in this invention is used in an amount at least sufficient so that the warping tendencies of the compositions are substantially completely eliminated. Such surface treated clay, amorphous silica or the like is employed in the amount of from about 5% to about 45% by weight of the total composition and preferably from about 10% to about 30% by weight.

A wide variety of other substituents may also be optionally employed in the improved compositions of this invention. Such substituents include but are not limited to talcs, micas such as phlogopite mica, silicas, $CaCO_3$, glass fibers or beads, flame retardants, and the like. Such materials, when used are generally present in the composition in an amount of from about 10% to about 40% by weight of the composition.

The compositions of this invention can be prepared by a number of relatively simple procedures. In one procedure the finely divided surface treated clay and impact modifier are dispersed in a matrix of the resin in the process. In another procedure, the clay and impact modifier are mixed with, for example, the poly(1,4-butylene terephthalate) resin by dry blending, then either fluxed on a mill and comminuted, or they are extruded and chopped.

Although it is not essential, best results are obtained if the constituents are pre-compounded, pelletized and then molded. Pre-compounding can be carried out in conventional equipment. For example, after carefully pre-drying the polyester, e.g., at 125° C. for 4 hours, a single screw extruder is fed with a dry blend of the constituents, the screw employed having long transition and metering sections to ensure proper melting. On the other hand, a twin screw extrusion machine, e.g., a Werner & Pfleider machine, can be fed with resins and additives at the feed port and with reinforcing agent downstream. In either case, a generally suitable machine temperature will be about 450° to 570° F.

The pre-compounded composition can be extruded and cut up into molding compounds such as conventional granules, pellets, etc., by standard techniques.

The compositions can be molded in any equipment conventionally used for thermoplastic compositions, e.g., a Van Dorn type injection molding machine with conventional cylinder temperatures, e.g., 500° F., and conventional mold temperatures, e.g. 150° F.

DESCRIPTION OF THE PREFERRED EMBODIMENTS

In order to illustrate the present invention the following examples thereof are set forth. It is to be understood that the examples are not to be construed as limiting the invention. In the examples, all parts are by weight unless otherwise indiated.

EXAMPLES I–IX

The following formulations are mechanically dry blended and extruded through a 2½ inch single screw extruder, then molded in a Van Dorn injection molding machine. The properties of the formulations after molding are also summarized in Tables 1 and 2.

TABLE 1

| | EXAMPLES I–VII | | | | | | |
|---|---|---|---|---|---|---|---|
| | Control I | II | III | IV | V | VI | VII |
| Constituents | | | | | | | |
| Valox 310[a] | 70 | 65 | 60 | 55 | 45 | 60 | 70 |
| Translink 445 clay[b] | 30 | 30 | 30 | 30 | 30 | — | — |
| Imsil A15[c] | — | — | — | — | — | 30 | 30 |
| Hytrel 4056[d] | 0 | 5 | 10 | 5 | 5 | 10 | — |
| Polyethylene Terephthalate | — | — | — | 10 | 20 | — | — |
| Properties | | | | | | | |
| Warpage R.T. (mm) | 0 | 0 | 0 | 0 | 0 | 0 | 0 |
| Warpage 350° F./30 min (mm) | 0 | 0 | 0 | 0 | 0 | 0 | 0 |
| Notched Izod Impact, ft.lb/in. | 0.8 | 1.2 | 1.6 | 1.1 | 1.0 | 1.6 | 1.0 |
| Unnotched Izod Impact, ft.lb/in. | 18 | 26 | 3.4 | 23 | 24 | 40 | 20 |
| Gardner Impact, in.-lbs. | 75 | 200 | 200 | 200 | 150 | 100 | 75 |
| Flexural Modulus (psi × $10^{-3}$) | 600 | 520 | 435 | 550 | 575 | 380 | 550 |
| Flexural Strength (psi × $10^{-3}$) | 16.6 | 14.6 | 12.7 | 15.2 | 15.4 | 11.5 | 15.6 |
| Tensile Strength (psi × $10^{-3}$) | 9.6 | 7.6 | 6.7 | 8.2 | 8.2 | 6.3 | 8.7 |
| % Elongation | 6 | 16 | 18 | 11 | 11 | 22 | 10 |
| DTUL at 264 psi, °F. | 180 | 150 | 150 | 166 | 170 | 139 | 180 |

[a]poly(1,4-butylene terephthalate) (commercially available from General Electric Company).
[b]Surface treated with A-1100-Gamma aminopropyl triethoxysilane. (commercially available from Freeport Kaolin Co.)
[c]Amorphous silica (commercially available from Illinois Mineral Co.) mean particle size 2.85 microns.
[d]Segmented copolyester-ether (du Pont).
[e]Intrinsic viscosity of 0.62 measured in a 60/40 solution of phenol and tetrachloroethane.

TABLE 2

| | Control VIII | IX |
|---|---|---|
| Constituents | | |
| Valox 315[a] | 63.45 | 48.45 |
| Translink 445[b] | 25 | 25 |
| FR-25[c] | 8.5 | 8.5 |
| $Sb_2O_3$ | 3 | 3 |
| Teflon 6[e] | 0.05 | 0.05 |
| Hytrel 4056[d] | — | 15 |
| Properties | | |
| Warpage R.T. (mm) | 0 | 0 |
| Warpage 350° F./30 min (mm) | 0 | 0 |
| Notched Izod Impact, ft.lb/in. | 0.7 | 1.4 |
| Unnotched Izod Impact, ft.lb/in. | 10 | 38 |
| Gardner Impact, in.-lbs. | 25 | 160 |
| Flexural Modulus (psi × $10^{-3}$) | 560 | 360 |
| Flexural Strength (psi × $10^{-3}$) | 15.9 | 11.9 |

TABLE 2-continued

|  | Control VIII | IX |
|---|---|---|
| Tensile Strength (psi × 10$^{-3}$) | 8.9 | 6.5 |
| % Elongation | 7 | 21 |
| DTUL at 264 psi, °F. | 166 | 148 |
| UL 94 | VO | VO |

$^a$poly(1,4-butylene terephthalate) (commercially available from General Electric Company)
$^b$Surface treated with A-1100-Gamma aminopropyl triethoxysilane (commercially available from Freeport Kaolin Co.)
$^c$Tetrabromo bisphenol-A/BPA polycarbonate end capped with tribromophenol (General Electric Company - proprietary material)
$^d$Segmented copolyester-ether (du Pont).
$^e$Tetrafluoroethylene (commercially available from du Pont).

Obviously, other modifications and variations of the present invention are possible in light of the above teachings. For example, small amounts of materials such as dyes, pigments, stabilizers, plasticizers, flame retardants, and the like can be added to the present compositions. It is to be understood, therefore, that changes may be made in the particular embodiments of the invention described which are within the full intended scope of the invention as defined by the appended claims.

I claim:

1. An improved thermoplastic molding composition comprising, in intimate admixture:
   (a) a poly(1,4-butylene terephthalate) resin;
   (b) a poly(ethylene terephthalate) resin;
   (c) an impact modifier of a segmented copolyester-ether; and
   (d) a filler material selected from the group consisting of finely divided surface treated clay and amorphous silica.

2. A composition as defined in claim 1, wherein the filler material is a finely divided surface treated clay which has a particle size of from about 1 to about 50 microns.

3. A composition as defined in claim 1 wherein the filler material is amorphous silica.

4. A composition as defined in claim 1, wherein the impact modifier is a segmented block copolyester-ether consisting of hard segments of polybutylene terephthalate and soft segments of polybutylene oxide.

5. A composition as defined in claim 1, which also contains a flame retardant additive.

6. A process for improving a thermoplastic composition comprising admixing:
   (a) a poly(1,4-butylene terephthalate) resin;
   (b) a poly(ethylene terephthalate) resin;
   (c) an impact modifier of a segmented copolyester-ether; and
   (d) a filler material selected from the group consisting of finely divided surface treated clay and amorphous silica, and forming a substantially homogenous, warp-free composition.

7. A process as defined in claim 6, wherein the filler material is finely divided surface treated clay which has a particle size of from about 1 to about 50 microns.

8. A process as defined in claim 6, wherein the filler material is amorphous silica.

9. A process as defined in claim 6, wherein the impact modifier is a segmented block copolyester-ether consisting of hard segments of polybutylene terephthalate and soft segments of polybutylene oxide.

10. A process as defined in claim 6, wherein a flame retardant composition is also added.

* * * * *